United States Patent [19]
Williams et al.

[11] 3,778,709
[45] Dec. 11, 1973

[54] CURRIE FOLLOWING STRAY ENERGY TEST SYSTEM

[75] Inventors: Robert A. Williams, Fort Worth, Tex.; David M. Holt, Fremont, Calif.

[73] Assignee: Williams Instruments, Inc., Fort Worth, Tex.

[22] Filed: Dec. 22, 1971

[21] Appl. No.: 210,794

[52] U.S. Cl. .................................. 324/72, 304/133
[51] Int. Cl. .................... G01r 19/16, G01r 31/02
[58] Field of Search ...................... 324/51, 72.5, 72, 324/133; 328/114, 132; 317/49

[56] References Cited
UNITED STATES PATENTS

| | | | |
|---|---|---|---|
| 3,487,265 | 12/1969 | Aaland | 317/49 X |
| 3,670,244 | 6/1972 | Trim | 324/133 X |
| 3,082,377 | 3/1963 | Filipowsky | 328/114 X |
| 3,624,503 | 11/1971 | Barrowcliff | 324/133 |

*Primary Examiner*—Gerard R. Strecker
*Attorney*—Wm. T. Wofford et al.

[57] ABSTRACT

The specification discloses a system for monitoring stray energy on a breech cap firing circuit on ejector racks, used in military aircraft weapons release systems to indicate on a GO/NO-GO basis whether the stray energy will prematurely fire the weapons. The system includes a pair of inputs coupled to an indicator by way of a series switch and a filter. The filter is calibrated to follow a predetermined voltage-time response curve which defines the threshold limits at which the stray energy will prematurely fire the release system. If the threshold limit at any point on the curve is reached, the filter produces a predetermined output which is sensed by threshold circuitry to actuate the indicator and turn off the series switch.

12 Claims, 5 Drawing Figures

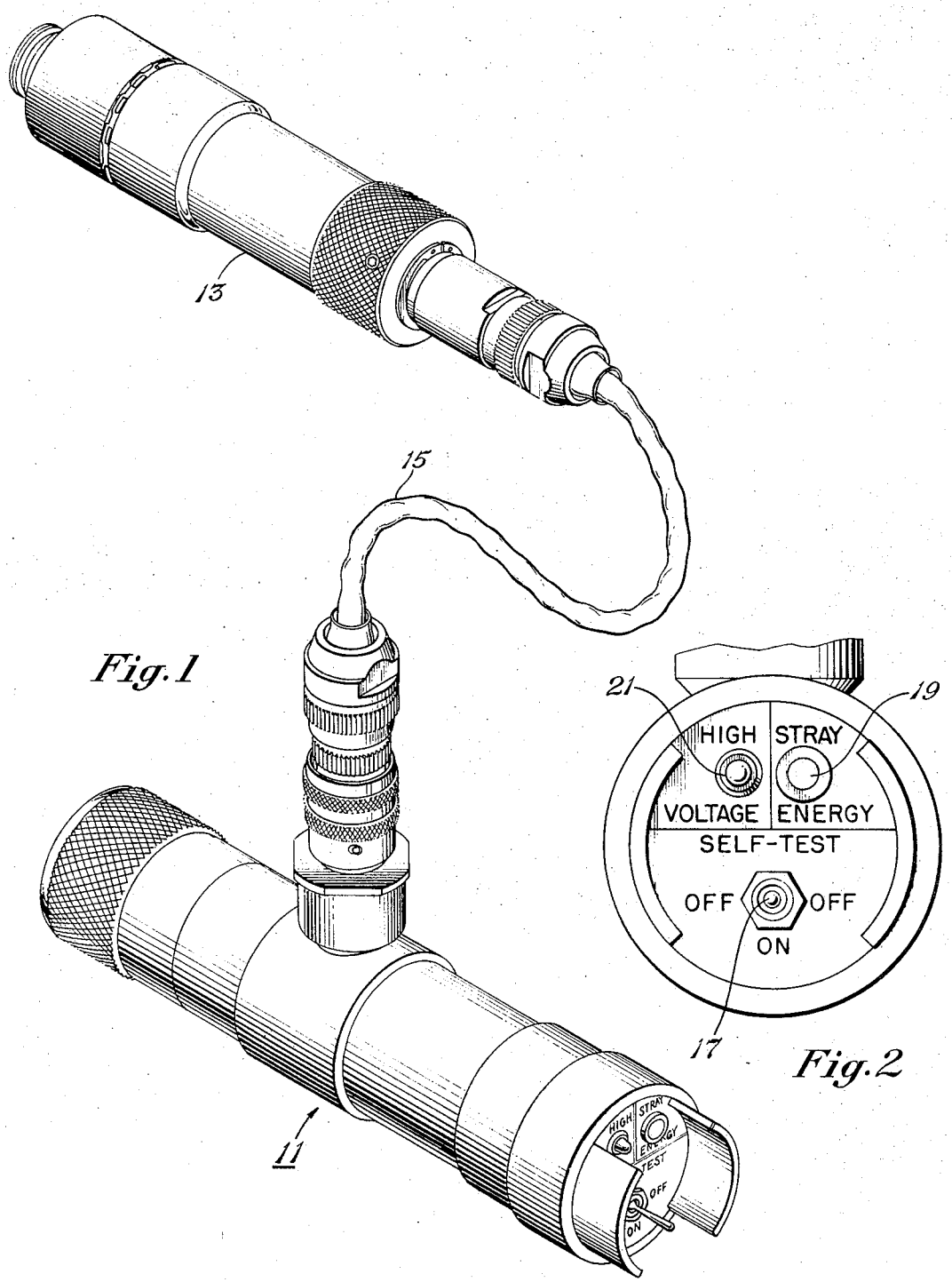

INVENTORS
Robert A. Williams
David M. Holt
BY
Wofford, Felsman & Fails
ATTORNEYS

CURRIE FOLLOWING STRAY ENERGY TEST SYSTEM

BACKGROUND OF THE INVENTION

This invention relates to an electrical test system for testing the energy level across the electrical contacts in a breech cap firing circuit to determine if the level of stray energy at a given time is greater than the threshold limit at which the firing circuit will be actuated.

As explained in U.S. Pat. Nos. 3,505,635 and 3,555,490, pyrotechnic cartridges are now extensively utilized in aircraft for ejecting bombs or other weapons. These cartridges are releasably connected with electrical circuitry, which when energized, detonates the cartridge, thus emitting a high-pressure gas which may, for example, release a latching device and immediately thereafter eject a bomb. Such devices have proven dangerous during the arming of aircraft prior to their missions. Premature ejection of a bomb may occur if the stray energy across the firing circuit builds up to a certain level within a certain period of time. Accordingly, it is essential that the firing circuit of such devices be tested prior to arming the weapons system to determine whether the stray energy is greater than the threshold level at which the firing system will be actuated.

SUMMARY OF THE INVENTION

In accordance with the present invention there is provided a stray energy test system for measuring the stray energy on a breech cap firing circuit employed on weapons release systems. The test system comprises a pair of inputs adapted to be coupled electrically to the contacts of the system to be tested; a filter for following a predetermined voltage-time curve and for producing a predetermined output when the energy applied to the inputs approaches or reaches the voltage limit of the curve for a given time; an indicator; and a threshold device coupled to the output of the filter for actuating the indicator when the predetermined output is produced by the filter.

In a further aspect, a switch is coupled between the contacts and the filter for passing to the filter the energy applied to the inputs. Current flow through the switch is maintained relatively constant when the input voltage varies above a certain level thereby maintaining constant the input impedance to the filter to enable the filter to follow the voltage-time response curve. In a further aspect means is coupled between the threshold device and the switch for rendering the switch nonconductive when the predetermined output is applied to the threshold device.

BRIEF DESCRIPTION OF THE DRAWINGS

FIG. 1 illustrates a housing which carries the test system of the present invention and which is electrically coupled to a test probe;

FIG. 2 illustrates one end of the housing showing test indicators and a switch;

DETAIL DESCRIPTION OF THE PREFERRED EMBODIMENT

Figure 3:
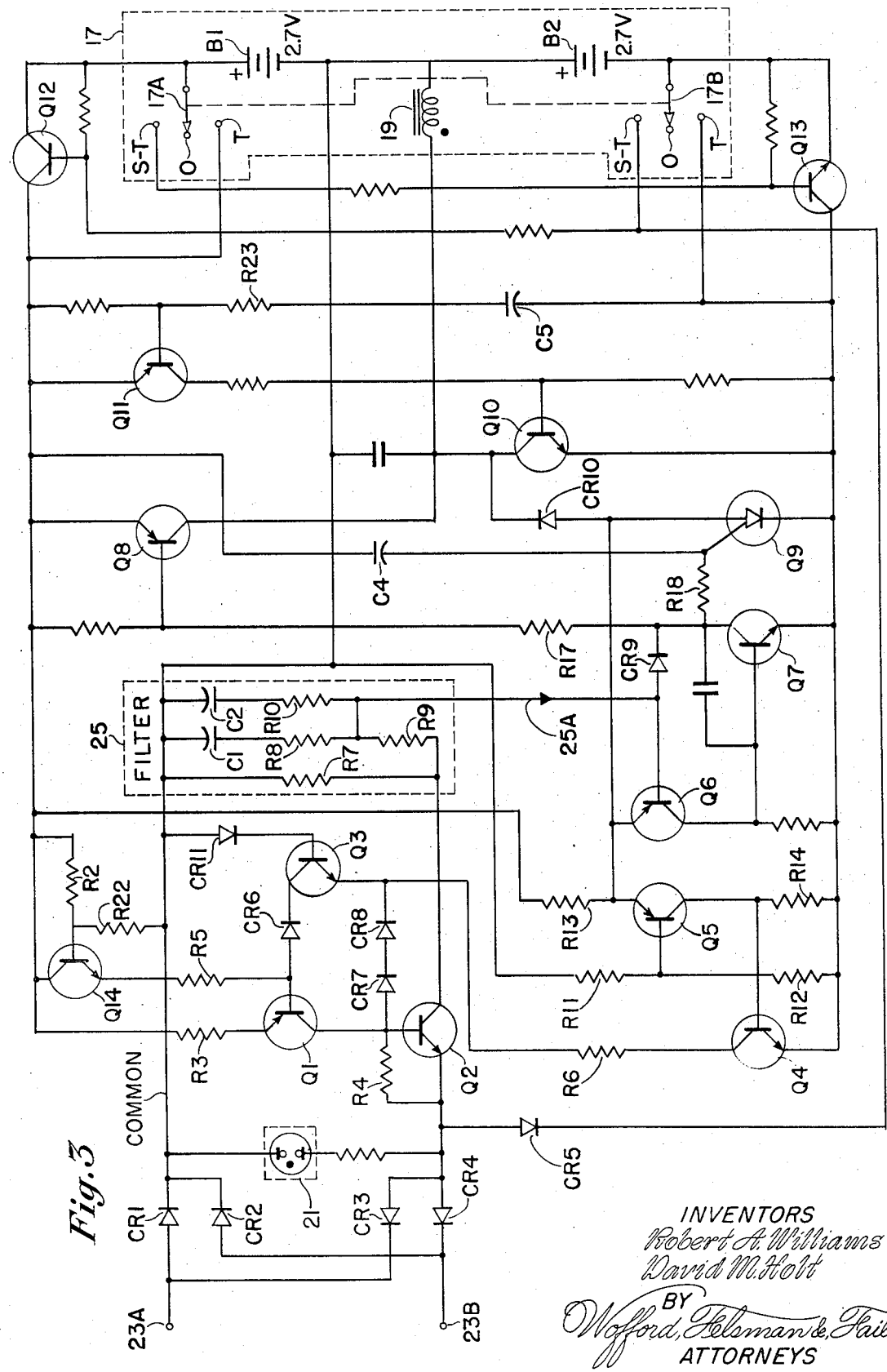
FIG. 3 is a schematic diagram of the circuitry of the test system of the present invention.

Referring now to FIG. 1, reference numeral 11 identifies a housing in which the circuitry of the test system of the present invention is located. Coupled to the circuitry in the housing 11 is a test probe 13 for insertion into a pyrotechnic cartridge well or breech cap. The test probe may be of the type disclosed in U.S. Pat. Nos. 3,505,635 or 3,555,490. It contains a pair of contacts for contacting the electrical contacts of the weapons firing system to be tested. The contacts of the probe 13 are coupled to the circuitry in the housing 11 by way of electrical conductors located in the cable illustrated at 15.

The test circuitry for testing the firing circuit of the weapons system includes input terminals; a series switch; a filter for following a predetermined response curve; a visual stray energy test indicator; and a threshold device coupled from the output of the filter to the series switch and to the visual indicator. Also provided is a mechanical switch which may be actuated to carry out test or self-test operations.

In FIG. 2, the mechanical switch is illustrated at 17 and is supported at the back end of the housing 11. It may be moved from the off to the on (test) or self-test positions to carry out test or self-testing operations. The visual stray energy test indicator is illustrated at 19. It indicates, in the test condition, whether the firing circuitry being tested is functioning properly or in self-test, whether the circuitry of the test system is functioning properly. Self-test is always carried out before test. Also supported by the back end face of the housing 11 is a high voltage indicator 21 for indicating whether a very high voltage exists across the firing circuit being tested.

Referring to FIG. 3, the input terminals of the test circuitry are illustrated at 23A and 23B. These terminals are coupled to the pair of contacts of the test probe by way of conductors in the cable 15. The series switch is a transistor illustrated at Q2. The filter coupled to the switch Q2 is illustrated at 25.

The input across the contacts of the firing circuitry being tested is applied to the series switch Q2 by way of the contact pair of the test probe 13, the conductors in cable 15, the input terminals 23A and 23B, and by way of diodes CR1, CR2, CR3, and CR4. These diodes rectify the input signals so that AC or DC or any polarity input voltage may be applied to the circuit. For any polarity input, the CR3 and CR4 junction (emitter of Q2) is always more negative than the CR1–CR2 junction which is the common point of the test circuit.

From the series switch Q2, the input being tested is applied to the filter 25. The output of the filter at 25A is applied to a threshold sensing circuitry comprising transistors Q6 and Q5 connected in a differential-pair type circuit. This threshold device controls the series switch Q2 and the visual indicator 19 as will be described subsequently.

Figure 4:
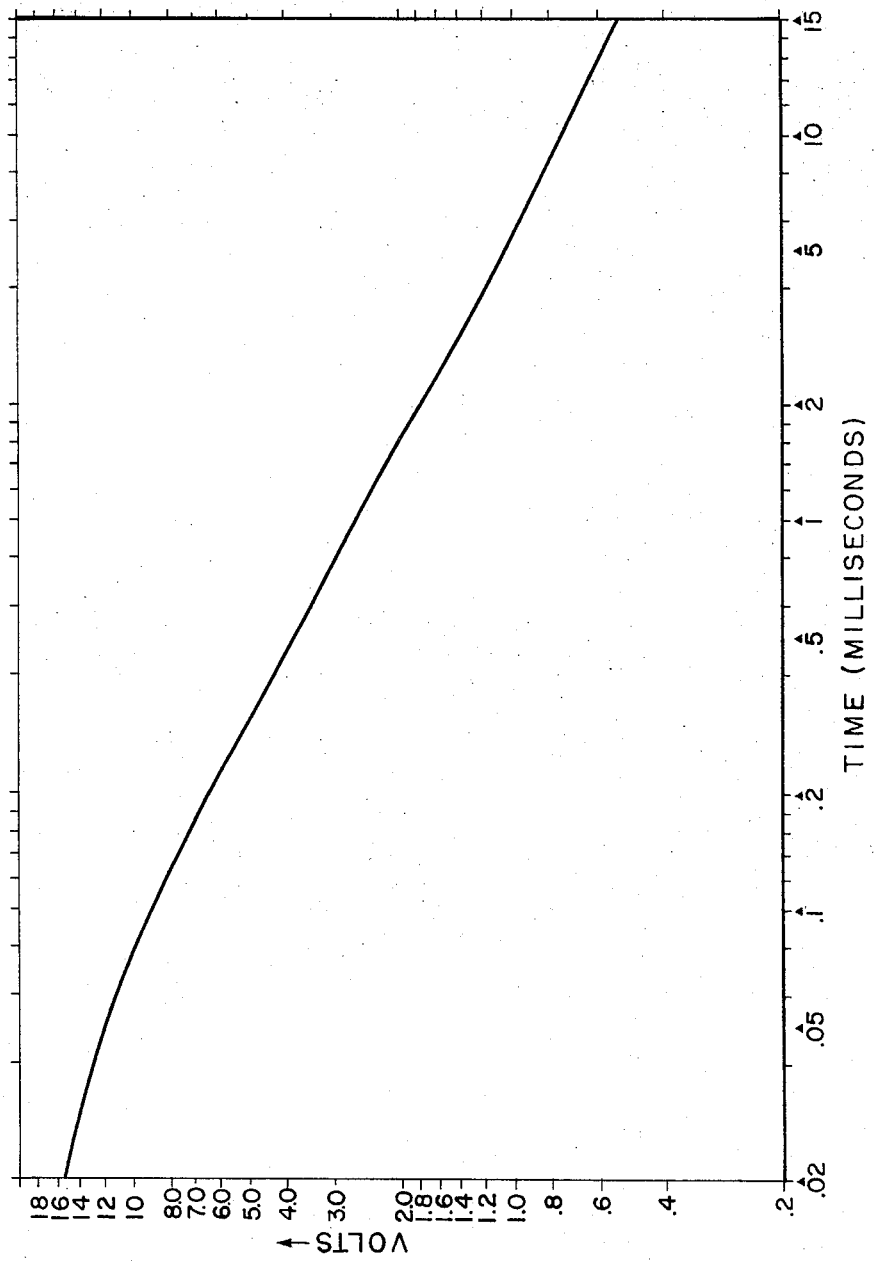
FIG. 4 is a voltage-time response curve which the test system of the present invention may follow to determine whether the level of stray energy is at or above the threshold limit at which a firing circuit may be actuated.

The filter 25 has been calibrated to follow a response curve of the type illustrated in FIG. 4. This curve is a function of voltage and pulse width or time. It has been found that for a given firing circuit of a release system, stray energy on the firing circuit, when it reaches a certain threshold level as a function of time, will cause the firing circuit to be actuated, thereby prematurely firing the release system. The curve of FIG. 4 was obtained by testing a given firing circuit of a release system to determine at what energy or voltage levels, as a function of time, the firing system would be actuated by stray energy on the circuit. This curve was derived by computing the arithmatic mean of the maximum and minimum values obtained from testing operations in which a firing circuit would be actuated as a function of time.

The filter 25 in its operation integrates the input applied thereto and if the input, as a function of time, corresponds to the threshold limits of the firing circuit, the filter 25 will produce a given output — in the present embodiment, a 0.5 volt output in the negative direction with respect to common. At that point, the filter has matched the response curve at a given voltage and time, thereby indicating that the threshold limits of the firing circuit has been exceeded and the firing circuit will prematurely be actuated by the stray energy there across. Thus for each point along the curve of FIG. 4, the filter will produce a 0.5 volt output in the negative direction and hence will follow the curve which defines the threshold limits of the stray energy or voltage as a function of time at which the firing circuit will be actuated.

The output of the filter is sensed by the threshold sensing circuitry including transistor Q6. When the output reaches 0.5 volts in the negative direction, the threshold device will be actuated to immediately turn off the series switch Q2 and also to actuate the indicator 19 to indicate that the firing circuit is faulty and should be repaired before the weapons system is loaded. By turning off series switch Q2, the test circuitry is disconnected thereby protecting the circuitry from a high input voltage.

The filter 25 shown is essentially a two stage filter with resistors R7, R8 and R9 and capacitor C1 providing a low frequency (long pulse durations) response filter and resistors R7, R9 and R10 and capacitor C2 providing a high frequency response filter (short pulse durations) with the crossover of the two filter stages at approximately 1.0 millisecond pulse durations. In one embodiment, resistors R7, R8, R9 and R10 were rated at 23.7 ohms, 2.21 kiliohms, 8.25 kiliohms, and 301 ohms respectively. In addition capacitors C1 and C2 were rated at 0.68 and 0.27 microfarads respectively.

The input impedance to the circuitry is maintained at about 25 ohms within the range of about 1.5 to 15 volts input. The input impedance seen at the test circuit input is a function of resistor R7 (resistor R9 being large enough to be neglected), the voltage drops across the input diodes CR1–CR4, the collector-emitter voltage drop of Q2 and the emitter current of Q2. The base current of Q1 is held relatively constant by transistor Q1 and resistor R3, whenever the input to the terminals 23A and 23B is between about 1.5 to 15 volts. Thus no matter what the input voltage within this range, the CR1–CR4 voltage drops, or the Q2 collector-emitter drop, the input still "sees" resistor R7 plus a constant amount of current, which is large enough to overshadow changes in diodes CR1–CR4 voltage drops and the Q2 collector-emitter drop. Thus the circuit appears to have a constant input impedance for voltages from about 1.5 to 15 volts thereby enabling the filter to follow the response curve within this range.

A more detail description of the circuitry of FIG. 3 and the elements thereof now will be given. The switch 17 comprises a manually controlled switch in which ganged switching elements 17A and 17B may be moved simultaneously to contact the test terminals T, the off terminals O, or the self-test terminals S–T respectively.

In one embodiment, the indicator 19 comprises a commercially available magnetic latching indicator (bistable) and which comprises a ball supported for rotation in a chamber and which has half of its outer shell painted black and the other half painted white. An electrical pulse applied to the indicator will rotate the ball to one of its two positions whereby either its white side or its black side is viewable to the observer. When the switch 17 is moved to the test position, the indicator will reflect the black side of the ball if the firing circuitry being tested is satisfactory and does not have stray energy above the threshold limits at which the firing system will be actuated. This is defined as the GO condition (for the test position of switch 17) and indicates that the weapons system may be safely loaded. If the stray energy however is above the threshold limits, then the indicator 19 will reflect the white side of the rotatable ball. This is defined as the NO-GO condition (for the test position of switch 17) and indicates that the firing circuit is faulty and must be repaired before the weapons system is loaded.

In the self-test position of the switch 17, the circuitry will simulate a NO-GO condition whereby the indicator 19 will reflect the white side of the ball indicating that the test circuitry and power supply is working satisfactory. If the test circuitry is faulty or the power supply is low, however, the indicator 19 (in self-test) will reflect a GO condition (the black side of the ball).

When the switch 17 is in the off position, the test circuitry is disconnected from the batteries B1 and B2 which each are rated at 2.7 volts. Since Q2 is off during this time, a high voltage input may be applied with no damage to the circuitry. Thus in the off position of the switch 17, the contacts of the test probe may be applied to the firing circuitry to test for the presence of a high voltage. Neon indicator 21 will conduct, if approximately 65 volts AC or 90 volts DC is applied to the input, to indicate a high voltage condition. The neon indicator 21 may be energized regardless of the position of switch 17.

In the test position, the switch 17 connects the batteries B1 and B2 to the test circuitry. When the switch 17 is moved to the test position, transistor Q11 is turned on which in turn turns on transistor Q10 for about 50 milliseconds. This connects one side of the indicator 19 to −2.7 volts and resets the indicator 19 to the GO position. Since the indicator 19 is bistable it remains in the GO position until again reset.

Capacitor C5 is not charged when switch 17 initially is moved to the test position. Capacitor C5 and resistor R23 have a time constant sufficient to allow Q11 to stay on for approximately 50 milliseconds. When transistor Q10 is on, it clamps the anode of programmable unijunction transistor Q9, through diode CR10, to approximately −2.1 volts and holds it and Q5 and Q6 off. When Q5 and Q6 are off, transistors Q4, Q7, Q3, Q1, and Q2 are all off and the test circuit is disconnected from the input. After the capacitor C5 charges to a positive enough level, Q11 turns off and Q10 turns off, allowing the emitters of the differential pair, transistors Q5 and Q6, to go to approximately zero volts.

Resistors R11 and R12 form a voltage divider on the base of transistor Q5, which sets the threshold voltage of the differential pair to approximately −0.5 volts. Since the bias on the base of Q5 is set when the switch 17 initially is moved to the test position, transistor Q5 turns on after Q10 turns off. This turns on transistor Q4, which turns on the connect transistor circuitry when an input is present. Thus the differential pair normally is latched (in the test position of switch 17) in the condition with transistors Q4 and Q5 on and transistors Q6 and Q7 off, since the base of transistor Q6 requires an input level of −0.5 volts from the filter to turn it on. In addition Q3 is on while Q8 and Q10 are off.

If the input is essentially "open circuit," i.e., mo emitter current in transistor Q2, then the transistor Q1 approaches turn-off. However when an input is present, and Q4 is on, transistor Q1 provides base current for Q2, which turns on and connects the test circuit.

Whenever the input energy applied to the filter causes the filter output to reach a level of −0.5 volts, transistor Q6 turns on, turning on transistor Q7 and turning off transistors Q5 and Q4.

When transistor Q7 turns on, it provides base current through resistor R17 for transistor Q8, which turns on, and connects the indicator 19 to +2.7 volts, which sets it to the NO-GO position. At the same time, transistor Q7 connects resistor R18 to −2.7 volts and allows capacitor C4 to charge through resistor R18, providing a time constant for the turn-on of the programmable unijunction transistor Q9. Approximately 40 milliseconds after transistor Q7 turns on, Q9 then turns on and the anode of Q9 connects the emitters of the differential-pair transistors Q5 and Q6 to −2.7 volts. This turns off Q5, Q6, Q4, Q1, Q2, Q3, and Q7 which turns off Q8. In this condition, the test circuit is disconnected from the input. The circuit will remain in this condition until reset by moving the switch 17 to the off position and then to the test position.

Diode CR9 is provided as "feedback" to the base of Q6 such that whenever Q7 turns on, it provides the base current path for Q6 instead of the filter providing it. This insures a positive turn-on of Q6, and also lowers the emitter of Q5 low enough to insure that Q5 turns off, thus providing a latching feature in the differential-pair.

In the self-test position of the switch 17, the potentials of the batteries B1 and B2 are again applied to the test circuitry but through transistors Q12 and Q13 which are turned on. However, in addition, the battery B2 potential is applied to the emitter of the connect transistor Q2 through the diode CR5. In the self-test position, the reset sequence is carried out whereby Q11 and Q10 are turned on to reset the indicator 19. They are then turned off after about 50 milliseconds as indicated previously. Whenever the reset sequence is completed, and the connect transistor Q2 is turned on, the potential provided by battery B2 normally is sufficient to simulate a NO-GO condition. Thus the output from the filter 25 will reach a level of −0.5 volts whereby Q2 will be turned off and the indicator will be actuated to indicate a NO-GO condition which indiates that the test circuitry is operating properly. If, however, the battery potentials are low, or marginal, the circuit will not respond to the simulated input and the NO-GO will not be registered and the indicator 19 will remain in its GO position, indicating that while in self-test, the test circuitry is not functioning properly.

Transistor Q3, resistor R6, and diodes CR6–CR8 form a unique turn-on circuit for Q1 such that when the test set input is below approximately 0.6 volts, the current through resistor R3 is small, limiting the battery B1 current drain to approximately 8 milliamps and B2 current drain to 2.5 milliamps. This is accomplished when transistor Q4 turns on, turning the grounded base transistor Q3 on. For Q3 to remain on, the maximum current allowable through resistor R6 is approximately 2 milliamps. If the input is essentially an "open circuit," ie, no emitter current in transistor Q2, then Q1 must approach turn-off since the only current path for the Q1 base and collector is ultimately through R6. However, when an input is present, and Q4 is on, Q1 provides up to 32 milliamps of base current for Q2, which turns on and connects the test circuit. This amount of base current for Q2 is required at higher voltage inputs because Q2 is required to conduct approximately 500 milliamps of collector current; and to provide the constant input impedance feature. Diodes CR7 and CR8 are 300 volt diodes and establish a voltage level at which the transistor Q2 base must exceed to draw base current. Diodes CR6-CR8 and transistor Q3 prevent transistor Q1 from saturation and allow it to provide current to transistor Q2 on a demand basis.

When Q4 and Q3 are on, the voltage at the base of Q1 (determined by the voltage drop across CR6) is fixed. When Q2 is fully turned on, because of the fixed base voltage of Q1, Q1 will draw a fixed amount of current through R3 regardless of how hard Q2 turns on. This sets the constant base current for Q2. When the input voltage to the test system is about 0.6 volt, Q2 starts to turn on, however, it does not turn on fully until the input voltage is about 1.5 volts. At this point, Q2 is drawing the full amount of base current and the voltage drop across the diode bridge is about 0.7 volt while the base-emitter drop of Q2 is about 0.7 volt. Since Q1 supplies current to Q2 when needed, it may be said to provide current to Q2 on a demand basis.

When the input voltage to the test system is above about 15 volts, the diode bridge drop and the base-emitter drop of Q2 become high enough whereby the input impedance does not remain constant.

In one embodiment, transistors Q2, Q1, and Q3 are identified as types MJ423, MM4646, and MPS5172. Transistor Q2 is rated at about 300 volts as well as transistor Q1. Diode CR6 is identified as IN4148, diodes CR7 and CR8 are identified as IN4003 respectively while diode CR11 is identified as 7A14. Diodes CR1–CR4 are 300 volts germanium diodes, of the IN93 type, and which have a low forward voltage drop. Resistor R3 is rated at 76.8 ohms, resistor R4 at 1 kiliohms, and R5 and R6 at 680 ohms each.

The purpose of transistor Q14, diode CR11, and resistors R2, R22, R4, and R5 are to insure that the circuitry operates properly at different temperatures.

Figure 5:
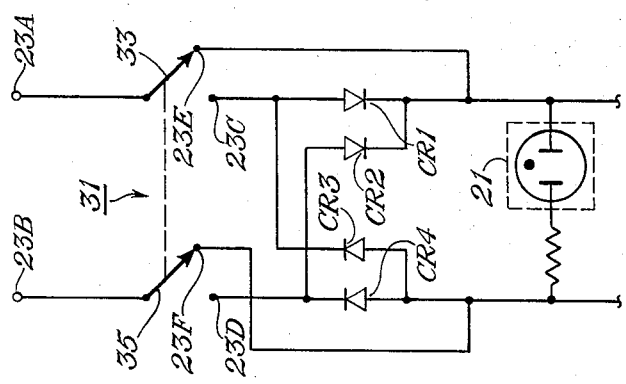
FIG. 5 illustrates a front end switch employed to switch out the front end diode bridge of the circuitry of FIG. 3.

Referring to FIG. 5, a front end switch 31 is disclosed for switching out the diode bridge in order to make the system sensitive to input voltage levels below about 0.7 volts. The switch 31 comprises ganged switch elements 33 and 35 which may be moved to contact terminals 23C and 23D in order to carry out the tests described previously and employing the function of the diode bridge. In order to test for voltages at levels lower than 1.5 volts, the bridge is switched out by moving the switch elements 33 and 35 to contact terminals 23E and 23F respectively. This test applies the input directly to switch Q2 and is employed after self-test and test is carried out as described previously and it has been determined that the stray energy level on the firing circuit is low.

In one embodiment the magnetic latching indicator 19 is of the type sold under the trademark "Minelco," a subsidiary of General Time of Holbrook, Mass., shown in their Bulletin B-11A entitled, "Miniature Bite Indicator," Model BHG21T. The use of such magnetic latching indicators in the system of the present invention has advantages in that they require a minimum amount of current for use. Thus a small current source may be employed in the system for long periods of time before replacement is required.

We claim:

1. A stray energy test system for measuring the stray energy on a firing circuit employed on weapons release systems, comprising:
    input means adapted to be coupled electrically to electrical contacts of a system to be tested,
    an electrical filter coupled to said input means for following a predetermined pulse width-voltage curve which is a function of the stray energy which will cause the firing circuit to be actuated, said filter producing a predetermined output when the input to said filter approaches the voltage limit of said curve for a given time,
    an indicator, and
    threshold circuitry coupled to the output of said filter for actuating said indicator when said predetermined output is produced.

2. The stray energy test system of claim 1 comprising:
    circuitry including switch means coupled between said input means and said filter for passing to said filter, the energy applied to said input means, and
    said circuitry including said switch means having the characteristic of maintaining the current flow therethrough relatively constant above a certain voltage level to maintain constant the electrical input impedance to said filter as the input voltage to said switch means varies.

3. The stray energy test system of claim 2 comprising:
    means coupled to said threshold circuitry and to said switch means for rendering said switch means nonconductive when said predetermined output is applied to said threshold circuitry.

4. The stray energy test system of claim 3 comprising:
    a source of electrical energy,
    a control switch coupled to said source of electrical energy and adapted to be moved to test or self-test terminal means to render said threshold circuitry in a state sufficient to sense for said predetermined output,
    said self-test terminal means being coupled to the input of said switch means to enable said system to carry out self-testing operations,
    said indicator being a magnetic latching type indicator having two states and which must be actuated to position said indicator in one of its states, and
    said system including means for initially applying a voltage level to said indicator when said switch means is moved to either the test or self-test terminal means to initially set said indicator to one of its states.

5. The system of claim 4 comprising:
    rectifier means coupled between said input means and said switch means for rectifying the input signal to be tested, and
    a front end switch coupled between said input terminals and said switch means for bypassing said rectifier means and applying the input directly to said switch means.

6. The stray energy test system of claim 3, wherein:
    said filter comprises a two stage filter, one stage comprising a resistance-capacitance network providing a low frequency response filter and the other stage comprising a resistance-capacitance network providing a high frequency response filter.

7. The stray energy test system of claim 6, wherein:
    said switch means comprises a transitor having its emitter coupled to said input means and its collector coupled to said filter, and
    means coupled to the base of said transitor for maintaining relatively constant the base current within a predetermined voltage range.

8. A stray energy test system for measuring the stray energy on a firing circuit employed on weapons release systems, comprising:
    input means adapted to be coupled electrically to electrical contacts of a system to be tested,
    an electrical filter coupled to said input means for following a predetermined pulse width-energy curve which is a function of the stray energy which will cause the firing circuit to be actuated, said filter producing a predetermined output when the input to said filter approaches the energy limit of said curve for a given time,
    an indicator,
    switch means coupled between said input means and said filter for passing to said filter the energy applied to said input means,
    means for maintaining relatively constant the electrical input impedance to said filter as the input to said switch means varies within a given range,
    an indicator,
    threshold circuitry coupled to the output of said filter for actuating said indicator when said predetermined output is produced, and
    means for rendering said switch means nonconductive when said predetermined output is applied to said threshold circuitry.

9. The stray energy test system of claim 8, comprising:
    a source of electrical energy,
    control switch means coupled to said source of electrical energy and adapted to be moved to test or self-test terminal means to render said threshold circuitry in a state sufficient to sense for said predetermined output,
    said self-test terminal means being coupled to the input of said switch means to enable said system to carry out self-testing operations.

10. The stray energy test system of claim 8, wherein:
    said indicator is a bi-stable latching type indicator having two states and which must be actuated to position said indicator in one of its states,
    said system including means for initially applying an input to said indicator when said switch means is moved to either the test or self-test terminals to initially set said indicator to one of its states.

11. The stray energy test system of claim 8, wherein:
    said filter comprises a two state filter, one stage comprising a resistance-capacitance network providing a low frequency response filter, the other stage comprising a resistance-capacitance network providing a low frequency response filter.

12. A stray energy test system for measuring the stray energy on a firing circuit employed on weapons release systems, comprising:
input means adapted to be coupled electrically to electrical contacts of a system to be tested,
an electrical filter coupled to said input means for following a predetermined pulse width-energy curve which is a function of the stray energy which will cause the firing circuit to be actuated, said filter producing a predetermined output when the input to said filter approaches the energy limit of said curve for a given time,
means for maintaining relatively constant the electrical input impedance to said filter as the input to said test system varies within a given range,
an indicator, and
threshold circuitry coupled to the output of said filter for actuating said indicator when said predetermined output is produced.

* * * * *

UNITED STATES PATENT OFFICE
CERTIFICATE OF CORRECTION

Patent No. 3,778,709          Dated December 11, 1973

Inventor(s) Robert A. Williams; David M. Holt

It is certified that error appears in the above-identified patent and that said Letters Patent are hereby corrected as shown below:

The title should be corrected to read as follows:

CURVE FOLLOWING STRAY ENERGY TEST SYSTEM

Signed and sealed this 17th day of September 1974.

(SEAL)
Attest:

McCOY M. GIBSON JR.                    C. MARSHALL DANN
Attesting Officer                       Commissioner of Patents